United States Patent
Anchi et al.

(10) Patent No.: US 10,949,262 B2
(45) Date of Patent: Mar. 16, 2021

(54) APPLICATION INPUT-OUTPUT WORKLOAD PRIORITIZATION

(71) Applicant: EMC IP Holding Company LLC, Hopkinton, MA (US)

(72) Inventors: Amit Pundalik Anchi, Bangalore (IN); Rimpesh Patel, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

(21) Appl. No.: 16/540,776

(22) Filed: Aug. 14, 2019

(65) Prior Publication Data

US 2021/0049046 A1 Feb. 18, 2021

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/5011* (2013.01); *G06F 2209/5018* (2013.01)

(58) Field of Classification Search
CPC .................................................... G06F 9/5038
See application file for complete search history.

(56) References Cited

U.S. PATENT DOCUMENTS

2002/0082856 A1* 6/2002 Gray .......................... G06F 9/50
718/104
2018/0074855 A1* 3/2018 Kambatla ................. G06F 9/50

* cited by examiner

*Primary Examiner* — Charlie Sun
(74) *Attorney, Agent, or Firm* — Krishnendu Gupta; Anne-Marie Dinius

(57) ABSTRACT

An apparatus comprises a host device configured to communicate over a network with a storage system. The host device comprises a multipath input-output driver configured to control delivery of input-output operations from the host device to the storage system over selected ones of a plurality of paths through the network. The input-output operations being generated by a plurality of applications of the host device and the multipath input-output driver having a plurality of dispatch resources. The host device is further configured to establish a plurality of application buckets for respective different application priority levels; and to allocate one or more dispatch resources to one or more of the plurality of applications depending upon the respective different application priority levels. In addition, the host device is configured to assign different ones of the applications of the host device to different ones of the application buckets. For a given one of the input-output operations, the host device is further configured to identify its corresponding one of the application buckets and utilize one or more of the allocated dispatch resources of the corresponding application bucket to control delivery of the given input-output operation to the storage system.

20 Claims, 4 Drawing Sheets

APPLICATION INPUT-OUTPUT WORKLOAD PRIORITIZATION

FIELD

The field relates generally to information processing systems, and more particularly to storage in information processing systems.

BACKGROUND

Storage arrays and other types of storage systems are often shared by multiple host devices over a network. However, it can be difficult in these and other situations to satisfy the particular input-output (IO) processing performance requirements of the potentially large numbers of distinct applications that may execute at different times on one or more host devices. As a result, the overall IO processing performance across the multiple distinct applications can be substantially less than optimal under certain conditions. Accordingly, a need exists for improved techniques for processing IO operations from multiple distinct applications sharing a storage system over a network.

SUMMARY

Illustrative embodiments provide techniques for increasing processing efficiency in storage systems and other networks by disproportionally allocating dispatch resources based on the priority of a particular application executing an IO on the system. Such techniques can be implemented in a host device and/or a storage system.

For example, in some host device embodiments, a multipath layer of one or more host devices is configured to include functionality for application input-output ("IO") workload balancing in conjunction with communication with a storage array or other type of storage system via a storage area network (SAN) or other type of network. The multipath layer illustratively comprises at least one multipath input-output (MPIO) driver configured to process IO operations of at least one host device.

In embodiments, we teach a method, an apparatus and a computer program product capable of comprising a host device configured to communicate over a network with a storage system. The host device comprises a multipath input-output driver configured to control delivery of input-output operations from the host device to the storage system over selected ones of a plurality of paths through the network. The input-output operations being generated by a plurality of applications of the host device and the multipath input-output driver having a plurality of dispatch resources. The host device is further configured to establish a plurality of application buckets for respective different application priority levels; and to allocate one or more dispatch resources to one or more of the plurality of applications depending upon the respective different application priority levels. In addition, the host device is configured to assign different ones of the applications of the host device to different ones of the application buckets. For a given one of the input-output operations, the host device is further configured to identify its corresponding one of the application buckets and utilize one or more of the allocated dispatch resources of the corresponding application bucket to control delivery of the given input-output operation to the storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
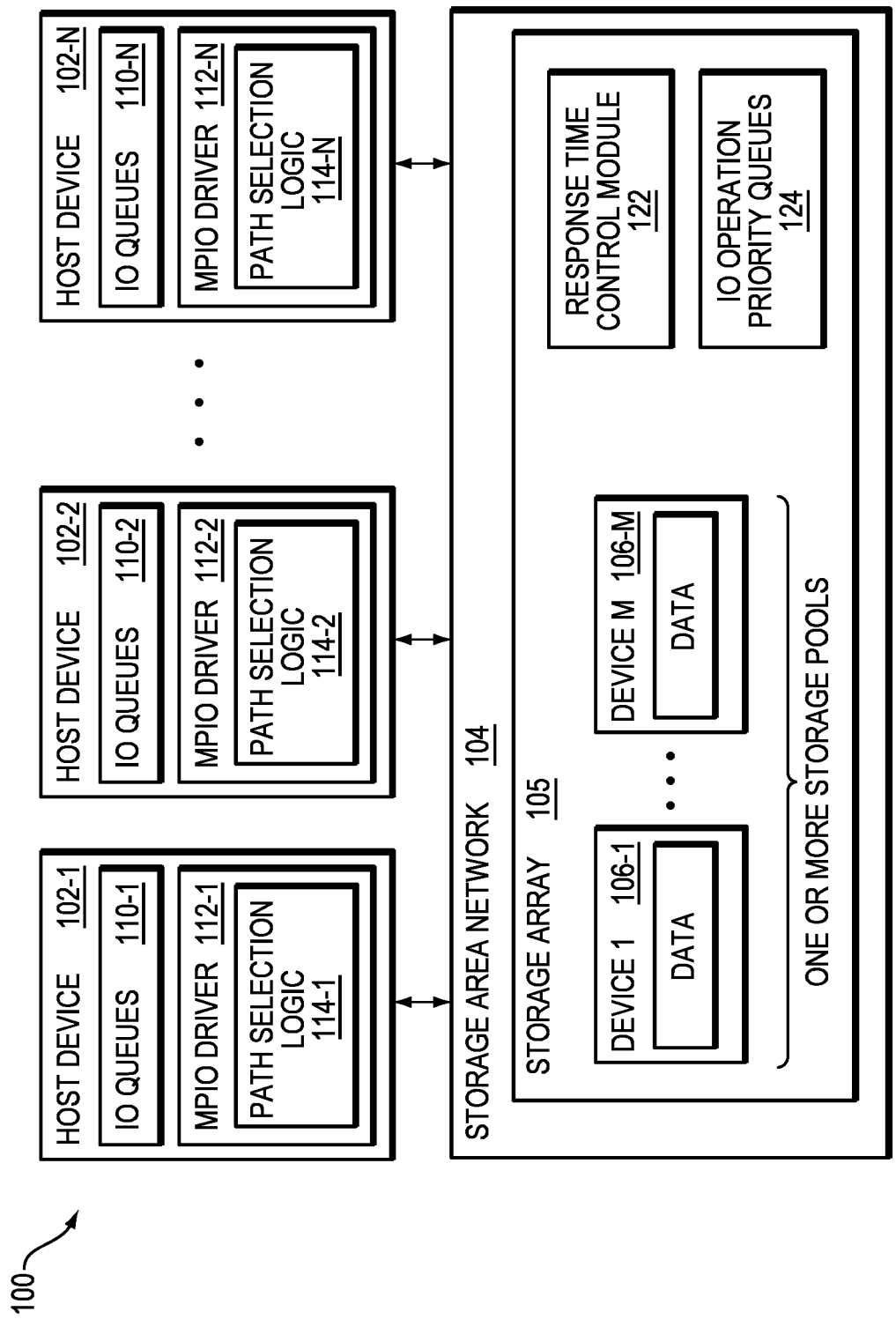
FIG. 1 is a block diagram of an information processing system configured with functionality for application IO workload prioritization in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute-services platform or other type of processing platform. The host devices 102 in such an arrangement illustratively provide compute services such as execution of one or more applications on behalf of each of one or more users associated with respective ones of the host devices 102.

Illustratively, host devices 102 may have operating systems (OS) running thereon. The OS can host an application. The OS on a host device can be a hypervisor or a bare metal OS in embodiments. Applications can run in a virtual machine or in a virtualized environment. Some examples, without limitation, could be products available from VMWare, or a container in a Linux/VMWare environment, or a bare metal operating system.

Traditionally, host IO stack software, sometimes referred to as "multipathing driver," intelligently routes all host application IO workloads. Presently, however, multipathing drivers do not implement and enforce IO workload prioritization based on an application associated with the IO when choosing routing among available paths. It would be advantageous to enforce and implement application IO workload prioritization at the multipath layer because this would allow the most important applications to be prioritized at the host layer itself. At least one result of this approach would be a prioritized enforcement of resources. An additional benefit would be reducing resource bursts caused by workloads associated with low priority applications.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, ... 110-N and respective MPIO drivers 112-1, 112-2, ... 112-N. The MPIO drivers 112 collectively comprise a multi-path layer of the host devices 102. The multi-path layer provides functionality for application prediction through machine learning based analysis of IO patterns using respective instances of path selection logic 114-1, 114-2, ... 114-N implemented within the MPIO drivers 112.

The MPIO drivers 112 may comprise, for example, otherwise conventional MPIO drivers, such as PowerPath® drivers from Dell EMC, suitably modified in the manner disclosed herein to implement functionality for application prediction. Other types of MPIO drivers from other driver vendors may be suitably modified to incorporate functionality for application IO processing as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 4.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

As indicated previously, absent use of the techniques for application IO workload prioritization as disclosed herein, it can be difficult to satisfy the particular IO processing performance requirements of the potentially large numbers of distinct applications that may execute at different times on the host devices 102, possibly leading to deficient performance across the multiple distinct applications.

These and other drawbacks are advantageously overcome in illustrative embodiments herein by utilization of a multi-path layer comprising one or more of the MPIO drivers 112 to facilitate application IO workload prioritization as described above.

For example, illustrative embodiments disclosed herein advantageously allow one or more of the host devices 102 and/or the storage array 105 of system 100 to better adapt limited IO processing resources as a function of application IO workload prioritization, thereby providing better overall IO processing performance across multiple distinct applications.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that include multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well as to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host device 102-1 may be configured to generate a notification for delivery to a host administrator responsive to an application prioritization. Additionally, or alternatively, the host device 102-1 may be configured to generate a notification for delivery to the storage array 105 responsive to an application prioritization. Other types of reporting arrangements are utilized in other embodiments.

The above-described functions of the MPIO driver 112-1 are carried out at least in part under the control of its path selection logic 114-1. For example, the path selection logic 114-1 is illustratively configured to control performance of the steps of the process to be described below in conjunction with FIG. 3. In other embodiments, one or more such steps can be more generally performed by the host device 102-1. Other system components such as storage array 105 can also participate in the FIG. 3 process.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to deliver IO operations from its corresponding one of the sets of IO queues 110 to the storage array 105 over selected paths through the SAN 104, and to perform at least portions of the disclosed functionality for application IO workload prioritization.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath IO," Dell EMC Engineering, June 2017, which is incorporated by reference herein. Such conventional MPIO functionality is suitably modified in illustrative embodiments disclosed herein to support application IO workload prioritization.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 122 and IO operation priority queues 124, illustratively configured to make use of the above-described persistent memory. For example, the response time control module 122 may be used to implement storage array based adjustments in response time for particular IO operations based at least in part on service level objective (SLO) information stored by the storage array 105 in its persistent memory. The response time control module 122 operates in conjunction with the IO operation priority queues 124.

The storage array 105 utilizes its IO operation priority queues 124 to provide different levels of performance for IO operations. For example, the IO operation priority queues 124 may have respective different priority levels. The storage array 105 may be configured to provide different priority levels for different ones of the IO operations by assigning different ones of the IO operations to different ones of the IO operation priority queues 124. The IO operation priority queues 124 are illustratively associated with respective SLOs for processing of IO operations in the storage array 105.

Process tags may be used in assigning different ones of the IO operations to different ones of the IO operation priority queues 124, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, sets of IO queues 110, MPIO drivers 112, and path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, the application prediction techniques disclosed herein can be utilized to recognize, identify or otherwise predict applications that are running in a storage system rather than on one or more host devices. In such an embodiment, the storage system can automatically adjust its IO processing resource allocations based at least in part on the application IO workload prioritization, possibly implemented within the storage system itself. For example, the storage system can set different priorities for different application types.

Figure 2:
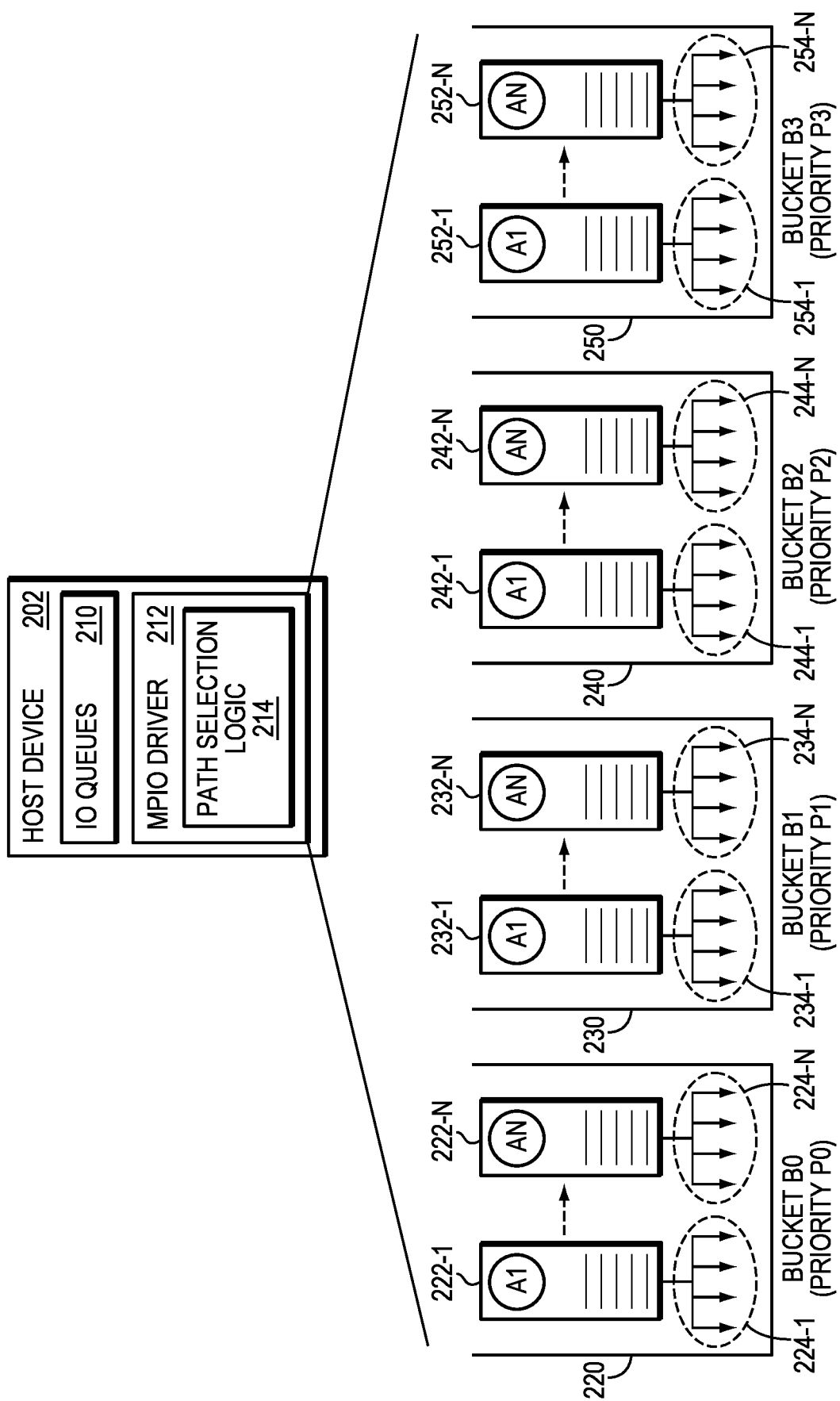
FIG. 2 is a block diagram of a host device configured with functionality for application IO workload prioritization in an illustrative embodiment.
Figure 3:
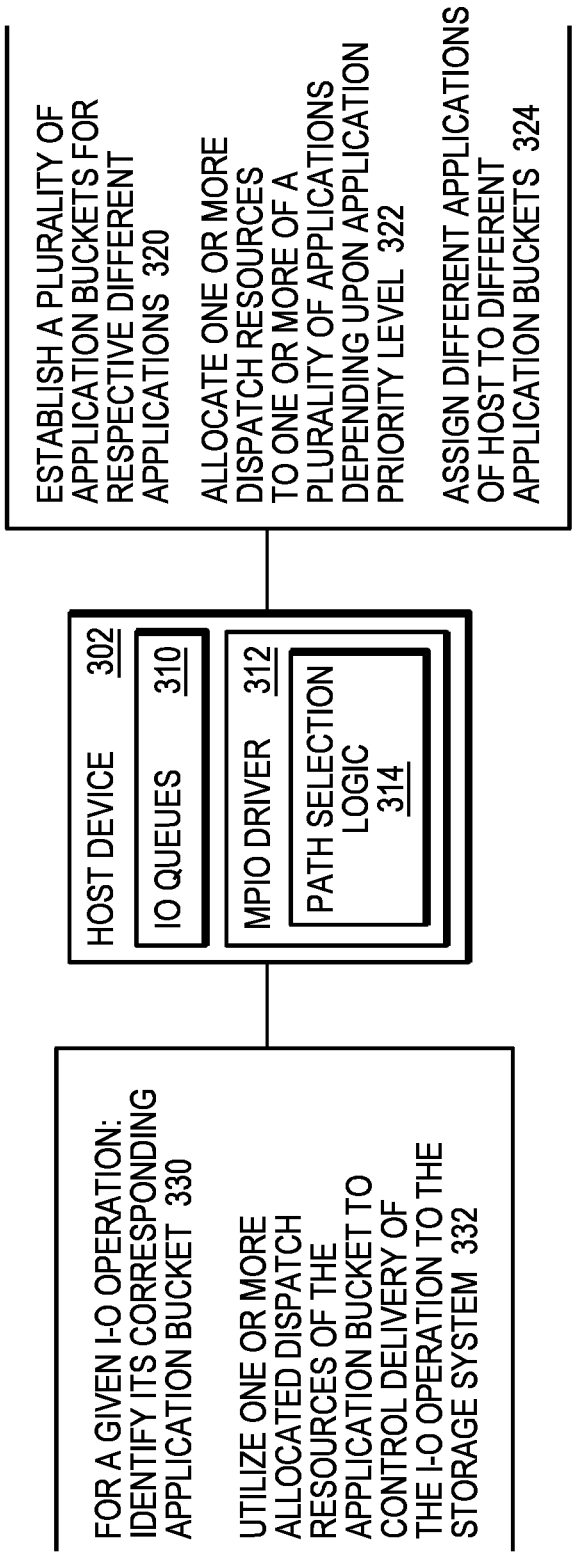
FIG. 3 is a flow diagram of a process for application IO workload prioritization in an illustrative embodiment.

The operation of the information processing system 100 will now be described in further detail with reference to illustrative embodiments as shown in FIG. 2 and FIG. 3. The process of FIG. 3 includes steps 320, 322, 324, 330, 332, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

The steps of the FIG. 3 process are illustratively performed at least in part by or under the control of an MPIO driver of a given host device. For example, portions of the process may be carried out under the control of software, firmware and/or hardware of an instance of path selection logic deployed within the MPIO driver. Other arrangements of host device components and/or other system components can be configured to perform at least portions of one or more of the steps in other embodiments.

Referring to FIG. 2 and FIG. 3, a host device 202, 302 includes IO queues 210, 310, MPIO driver 212, 312 and path selection logic 214, 314. These devices/logic perform similarly as described with respect to FIG. 1, with the following additional functionality. MPIO driver 212, 312 can be configured to control delivery of input-output operations from host 202, 302 to the storage system (not pictured). In embodiments, the input-output operations can be generated by a plurality of applications on host 202, 302. MPIO 212, 312 has a plurality of dispatch resources, sometimes referred to as threads.

In order to optimize use of these dispatch resources, host 202, 302 can be configured to establish 320 a plurality of application buckets 220, 230, 240, 250 for respective different applications. Additionally, host 202, 302 can be further configured to allocate 322 different ones of the applications of host 202, 302 to different ones of the application buckets 220, 230, 240, 250. As can be seen, application buckets 220, 230, 240 and 250 have varying priorities. The highest priority bucket 220 is assigned a priority of P0. Buckets 230, 240, 250 have decreasing priorities of P1, P2, and P3, respectively.

In operation, when an IO is received, MPIO 212, 312 controls delivery of the operation to the proper bucket 220, 230, 240, 250 depending upon the priority of the application. For example, an application having a priority of P0 would be routed to bucket 220 and placed in queue 222-1 through 222-N. For these top priority applications, MPIO 212, 312 could allocate a larger number of dispatch resources or threads 224-1. In FIG. 2, applications having a priority of P0 are allocated four (4) threads 224-1-224-N each. In contrast, applications having a priority of P1 are allocated three (3) threads 234-1-234-N. Likewise, applications having a priority of P2 are allocated two (2) threads 255-1-244-N; and applications having a priority of P3 are allocated a single thread 254-1-254-N.

Of course, the number of threads used in this example is illustrative and would vary in alternate embodiments depending upon available dispatch resources. Furthermore, it can be seen from FIG. 2, application buckets 220, 230, 240, 250 comprise per-application queues 224, 234, 244, 254, respectively.

For a given IO operation, MPIO 212, 312 is configured to identify 330 an application bucket depending on the priority level of the application. Moreover, MPIO 212, 312 is further configured to utilize 332 one or more allocated dispatch resources of the application bucket to control delivery of IO operations to the storage system.

In embodiments, allocating 320 different amounts of dispatch resources of MPIO 212, 312 to application buckets 220, 230, 240, 250 can further comprise allocating a first number of per-application dispatcher threads 224, 234 to a first one of the application buckets having a relatively high priority level, for example application bucket 220, having a priority of P0, or application bucket 230, having a priority of P1.

In embodiments, allocating 320 could further comprise allocating a second number of per-application dispatcher threads 244, 254 to a second application bucket 240, 250 having a lower priority level.

In some embodiments, application priority levels can be stored in a table on host or alternatively elsewhere within the system 100.

In some embodiments, a mapping of a process name or a process ID to the one or more application priority levels can be passed from a user space to MIPO 212, 312.

Similarly, one or more of a kernel thread context, an application name, an application ID, a process name, or a process ID can be obtained using a kernel service.

In embodiments, dispatch resources 224, 234, 244, 254 are allocated on a per-application basis. It is to be understood that embodiments support running a plurality of applications on a virtual machine or in an virtualized environment.

The IO pattern for a given one of the applications illustratively comprises a pattern of IO operations generated by the application and delivered from the host device to the storage system over selected paths under the control of an MPIO driver. For example, one or more IO operations selected from one or more queues of a given set of queues of the host device are illustratively directed to a particular logical storage device of the storage array over a selected one of a plurality of available paths, with each such path being associated with a different initiator-target pair, where the initiators comprise respective HBAs of the host device and the targets comprise respective ports of the storage array.

At least some of the paths from the host device to the storage array may be determined using an initial path discovery scan performed in conjunction with booting of the host device. It is assumed for the description of this embodiment that the host device has discovered a plurality of paths to the storage array, and further that at least one logical storage device of the storage array is visible to the host device on each of the paths.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths over which IO operations are delivered from the host device to particular logical devices of the storage array can change over time.

Multiple additional instances of the FIG. 3 process may be performed in respective additional host devices that share the storage array.

The particular processing operations and other system functionality described in conjunction with the flow diagram of FIG. 3 are presented by way of illustrative example only, and should not be construed as limiting the scope of the disclosure in any way. Alternative embodiments can use other types of processing operations involving host devices, storage systems and functionality for application prediction through machine learning based analysis of IO patterns. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different application prediction arrangements within different host devices and/or storage arrays of a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 4:
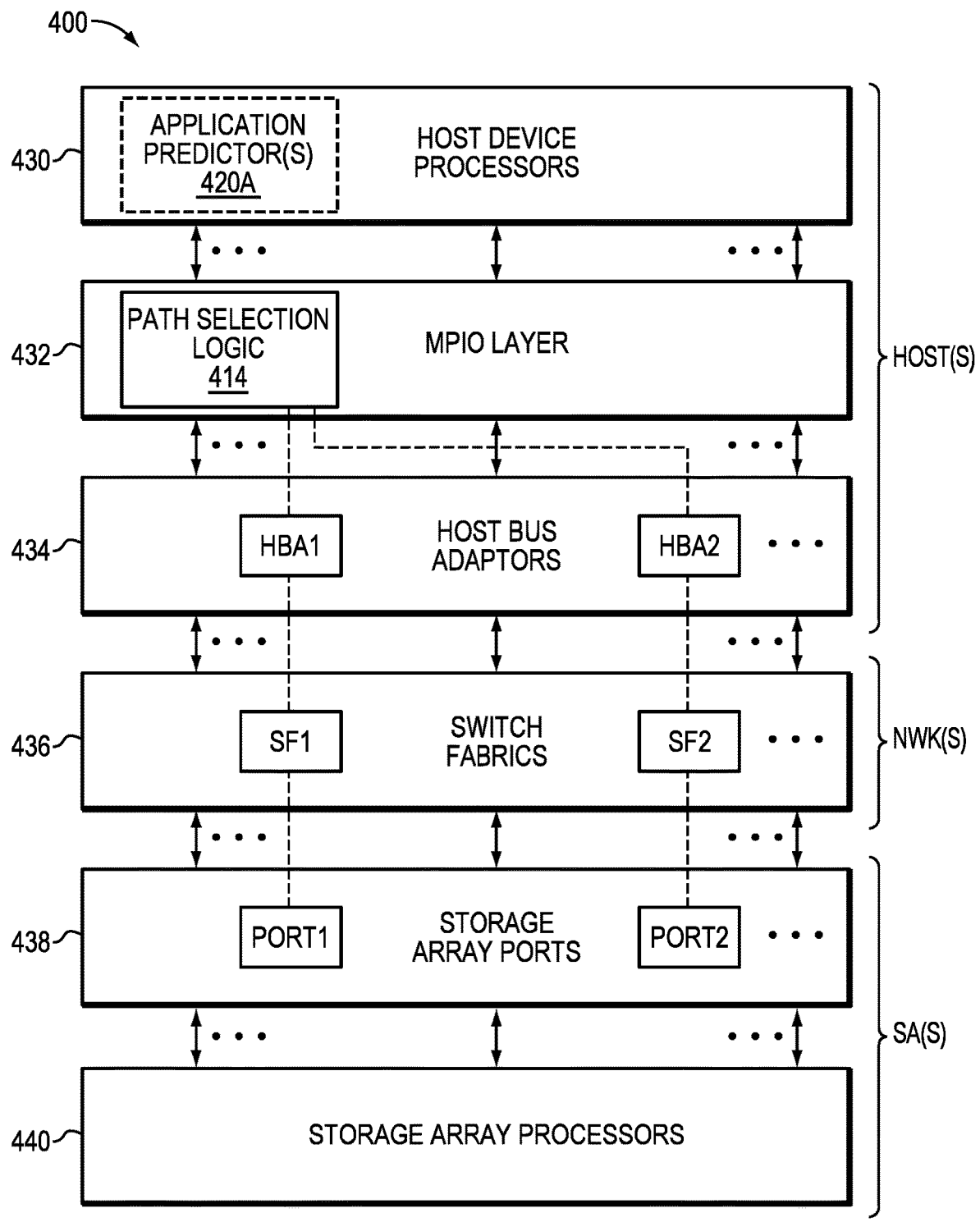
FIG. 4 a block diagram showing multiple layers of a layered system architecture that includes functionality for application IO workload prioritization in an illustrative embodiment.

Referring now to FIG. 4, another illustrative embodiment is shown. In this embodiment, an information processing system 400 comprising at least one instance of path selection logic 414 is configured in accordance with a layered system architecture that illustratively includes a host device processor layer 430, an MPIO layer 432, an HBA layer 434, a switch fabric layer 436, a storage array port layer 438 and a storage array processor layer 440. The host device processor layer 430, the MPIO layer 432 and the HBA layer 434 are associated with one or more host devices, the switch fabric layer 436 is associated with one or more SANs or other types of networks, and the storage array port layer 438 and storage array processor layer 440 are associated with one or more storage arrays ("SAs").

The MPIO layer 432 is an example of what is also referred to herein as a multi-path layer and comprises one or more MPIO drivers implemented in respective host devices. Each such MPIO driver illustratively comprises an instance of path selection logic 414 configured substantially as previously described. Additional or alternative layers and path selection logic arrangements can be used in other embodiments.

In the system 400, path selection logic 414 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system 10 configuration and its deployed numbers of HBAs, switch fabrics and storage array ports. For example, each host device in the FIG. 4 embodiment can illustratively have a set of n paths to a shared storage array, or alternatively different ones of the host devices can have different numbers and types of paths to the storage array.

The path selection logic 414 of the MPIO layer 432 in this embodiment selects paths for delivery of IO operations to the one or more storage arrays having the storage array ports of the storage array port layer 438.

Some implementations of the system 400 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 400 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths. For example, the storage array in some embodiments can be configured to increment a counter if zoning and masking has changed, and the MPIO driver of the host device can utilize a log sense command, a mode sense command or a "vendor unique" or VU command to determine the current counter value and trigger path discovery based on a change in that value.

Illustrative embodiments allow a host device and/or a storage system to better adapt limited IO processing resources as a function of application priority, thereby providing better overall IO processing performance across multiple distinct applications.

These and other embodiments are broadly applicable to a wide variety of different use cases and application types. For example, some embodiments are particularly useful in cloud infrastructure deployments It is to be appreciated that the particular advantages described above are associated with particular illustrative embodiments and need not be present in other embodiments.

Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

The cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components and may comprise conventional transceivers.

As another example, portions of a given processing platform in some embodiments can comprise converged infrastructure such as VxRai™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only.

Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, application predictors, machine learning systems, machine learning models and additional or alternative components. Also, the particular configurations of system and device elements and associated processing operations illustratively shown in the drawings can be varied in other embodiments. For example, a wide variety of different MPIO driver configurations and associated application prediction arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processor configured to communicate over a network with a storage system comprising a plurality of storage devices;
the processor comprising a multipath input-output driver configured to control delivery of input-output operations from the processor to the storage system over selected ones of a plurality of paths through the network, the input-output operations being generated by a plurality of applications of the processor and the multipath input-output driver having a plurality of dispatch resources;
wherein the processor is further configured to:
establish a plurality of application buckets for respective different application priority levels;
allocate one or more dispatch resources to one or more of the plurality of applications depending upon the respective different application priority levels;
assign different ones of the applications of the host device to different ones of the application buckets; and
for a given one of the input-output operations:
identify its corresponding one of the application buckets; and
utilize one or more of the allocated dispatch resources of the corresponding application bucket to control delivery of the given input-output operation to the storage system.

2. The apparatus of claim 1 wherein allocating different amounts of dispatch resources of the multi-path input-output driver to different ones of the application buckets comprises: allocating a first number of per-application dispatcher threads to a first one of the application buckets having a relatively high priority level; and allocating a second number of per-application dispatcher threads less than the first number of dispatcher threads to a second one of the application buckets having a relatively low priority level.

3. The apparatus of claim 1 wherein each of the application buckets comprises a plurality of per-application queues for queuing input-output operations of respective ones of the applications assigned to that application bucket.

4. The apparatus of claim 1 wherein the IO is received from an operating system.

5. The apparatus of claim 1 wherein different application priority levels are stored in a table on the host device.

6. The apparatus of claim 1 wherein a mapping of a process name or a process ID to the one or more of the different application priority levels can be passed from a user space to the multipath input-output driver.

7. The apparatus of claim 1 wherein one or more of a kernel thread context, an application name, an application ID, a process name or a process ID is obtained using a kernel service.

8. The apparatus of claim 1 wherein an application bucket among the plurality of application buckets is a logical grouping of applications having a same priority level.

9. The apparatus of claim 1 wherein the dispatch resources are allocated on a per-application basis.

10. The apparatus of claim 1 wherein the plurality of applications can be run on a virtual machine or in a virtualized environment.

11. A method comprising: controlling, in a multipath input-output driver of a host device, delivery of input-output operations from a host device to a storage system over selected ones of a plurality of paths through a network, the input-output operations being generated by a plurality of applications of the host device and the multipath input-output driver having a plurality of dispatch resources; wherein the host device is further configured to: establish a plurality of application buckets for respective different application priority levels; allocate one or more dispatch resources to one or more of the plurality of applications depending upon the respective different application priority levels; assign different ones of the applications of the host device to different ones of the application buckets; and for a given one of the input-output operations: identify its corresponding one of the application buckets; and utilize one or more of the allocated dispatch resources of the corresponding application bucket to control delivery of the given input-output operation to the storage system.

12. The method of claim 11 herein allocating different amounts of dispatch resources of the multi-path input-output driver to different ones of the application buckets comprises: allocating a first number of per-application dispatcher threads to a first one of the application buckets having a relatively high priority level; and allocating a second number of per-application dispatcher threads less than the first number of dispatcher threads to a second one of the application buckets having a relatively low priority level.

13. The method of claim 11, wherein each of the application buckets comprises a plurality of per-application queues for queuing input-output operations of respective ones of the applications assigned to that application bucket.

14. The method of claim 11, wherein the IO is received from an operating system.

15. The method of claim 11, wherein different application priority levels are stored in a table on the host device.

16. The method of claim 11, wherein a mapping of a process name or a process ID to the one or more of the different application priority levels can be passed from a user space to the multipath input-output driver.

17. The method of claim 11, wherein one or more of a kernel thread context, an application name, an application ID, a process name or a process ID is obtained using a kernel service.

18. The method of claim 11, wherein an application bucket among the plurality of application buckets is a logical grouping of applications having a same priority level.

19. The method of claim 11, wherein the plurality of applications can be run on a virtual machine or in a virtualized environment.

20. A computer program product comprising a non-transitory processor-readable storage medium having stored therein program code of one or more software programs, wherein the program code, when executed by a host device comprising a multipath input-output driver, the host device being configured to communicate over a network with a storage system, the input-output operations being generated by a plurality of applications of the host device and the multipath input-output driver having a plurality of dispatch resources, wherein the host device is further configured to: establish a plurality of application buckets for respective different application priority levels; allocate one or more dispatch resources to one or more of the plurality of applications depending upon the respective different application priority levels; assign different ones of the applications of the host device to different ones of the application buckets; and for a given one of the input-output operations: identify its corresponding one of the application buckets; and utilize one or more of the allocated dispatch resources of the corresponding application bucket to control delivery of the given input-output operation to the storage system.

* * * * *